United States Patent
Bernert et al.

(10) Patent No.: US 10,184,538 B2
(45) Date of Patent: Jan. 22, 2019

(54) TELESCOPABLE SPRING SUPPORT

(71) Applicant: LISEGA SE, Zeven (DE)

(72) Inventors: Joerg Bernert, Zeven-Hofkoh (DE); Ekkehard Heinrichs, Zeven (DE); Arnold Radtke, Zeven (DE)

(73) Assignee: LISEGA SE, Zeven (DE)

(*) Notice: Subject to any disclaimer, the term of this patent is extended or adjusted under 35 U.S.C. 154(b) by 0 days.

(21) Appl. No.: 15/315,994

(22) PCT Filed: Jun. 2, 2015

(86) PCT No.: PCT/EP2015/062298
§ 371 (c)(1),
(2) Date: May 22, 2017

(87) PCT Pub. No.: WO2015/185574
PCT Pub. Date: Dec. 10, 2015

(65) Prior Publication Data
US 2017/0261130 A1 Sep. 14, 2017

(30) Foreign Application Priority Data
Jun. 2, 2014 (DE) .......................... 10 2014 107 701

(51) Int. Cl.
*F16F 1/12* (2006.01)
*F16L 3/205* (2006.01)
(Continued)

(52) U.S. Cl.
CPC ................ *F16F 1/12* (2013.01); *F16F 1/041* (2013.01); *F16F 15/067* (2013.01);
(Continued)

(58) Field of Classification Search
CPC ....... F16L 3/205; F16L 3/2053; F16F 15/067; F16F 1/041; F16F 1/12; F16M 11/28
(Continued)

(56) References Cited

U.S. PATENT DOCUMENTS 2,540,525 A * 2/1951 Howarth ................... F16F 1/12
248/542
3,000,600 A 5/1959 Suozzo
(Continued)

FOREIGN PATENT DOCUMENTS

DE 2820467 11/1978
DE 3334136 C2 * 3/1987 ............ F16L 3/2053
(Continued)

OTHER PUBLICATIONS

English translation of International Search Report dated Aug. 31, 2015, received in corresponding PCT Application No. PCT/EP2015/062298.
(Continued)

*Primary Examiner* — Eret C McNichols
(74) *Attorney, Agent, or Firm* — Grossman, Tucker, Perreault & Pfleger, PLLC

(57) ABSTRACT

A telescopable spring support which comprises a housing, a pressure plate, a load pipe, and a pressure spring and which is designed to elastically support components in a load direction. The housing has a stand side and an upper side, and the pressure plate is arranged in the housing and can be moved within the housing in the load direction. The pressure spring is arranged between the pressure plate and the stand side and applies a spring force to the pressure plate, said spring force being directed towards the upper side in the load direction. The load pipe is connected to the pressure plate and, in each position of the pressure plate, extends outwards from the interior of the housing through an opening arranged on the upper side of the housing. The housing comprises a stand housing and a movable housing. The movable housing can be moved towards the stand housing in the load direction, wherein the stand housing has a stand side, and the movable housing has the opening.

19 Claims, 5 Drawing Sheets

(51) Int. Cl.
  *F16F 1/04* (2006.01)
  *F16F 15/067* (2006.01)
  *F16M 11/28* (2006.01)
(52) U.S. Cl.
  CPC ............ *F16L 3/2053* (2013.01); *F16M 11/28* (2013.01); *F16L 3/205* (2013.01)
(58) Field of Classification Search
  USPC .................................. 248/573, 615, 616, 624
  See application file for complete search history.

(56) References Cited

U.S. PATENT DOCUMENTS

| | | | | |
|---|---|---|---|---|
| 2,981,511 | A * | 4/1961 | Suozzo | F16L 3/2053 267/140.2 |
| 3,814,357 | A * | 6/1974 | Rontgen | F16F 1/128 248/573 |
| 4,069,992 | A * | 1/1978 | Lada | F16F 1/041 248/544 |
| 4,235,317 | A | 11/1980 | Maciejewski | |
| 4,457,196 | A | 7/1984 | Cady | |

FOREIGN PATENT DOCUMENTS

| | | | |
|---|---|---|---|
| DE | 19532863 | 3/1996 | |
| DE | 10053576 C1 * | 3/2002 | ............ B60F 15/063 |
| EP | 2664816 | 11/2013 | |
| GB | 565189 A * | 10/1944 | ............ F16L 3/2053 |
| GB | 1485326 A * | 9/1977 | ............ F16L 3/2053 |
| JP | 52-102582 | 8/1977 | |
| JP | 54-24182 | 8/1979 | |
| JP | S54-141962 | 11/1979 | |
| JP | S55-59899 | 4/1980 | |
| JP | S56-23788 | 3/1981 | |
| JP | H4-73631 | 6/1992 | |
| KR | 20-0311970 | 5/2003 | |

OTHER PUBLICATIONS

English translation of International Preliminary Report on Patentability dated May 12, 2016, received in corresponding PCT Application No. PCT/EP2015/062298.
Votice of Reasons for Refusal received in related Japanese Appln. No. 2016-571055, dated Jul. 11, 2017. English translation attached.
Votice of Reasons for Refusal received in related Japanese Appln. No. 2016-571055, dated Jan. 16, 2018. English translation attached.
Notice of Preliminary Rejection received in related Korean Appln. No. 10-2016-7036717, dated Jul. 28, 2017. English translation attached.
Notice of Preliminary Rejection received in related Korean Appln. No. 10-2016-7036717, dated Dec. 8, 2017. English translation attached.

* cited by examiner

TELESCOPABLE SPRING SUPPORT

FIELD

The invention relates to a telescopable spring support.

BACKGROUND

Conventional spring supports are used in plant engineering or in pipeline construction for the resilient support of components in a loading direction. The use of such spring supports is especially required in such applications in which the loading force, which is exerted by a component on the supporting spring support, varies depending on the situation and resilient yielding should be provided to the loading force. This is the case for example in displacements by expansion of components in the loading direction which can occur by heat for example. Such requirements exist especially in pipeline construction when a respectively different expansion behaviour of the pipelines at different temperatures is obtained and thus a displacement by expansion of the pipeline occurs in the loading direction.

Conventional spring supports are used in such a way that components are placed on the spring supports so that the spring supports carry the load of the components. A component exerts a loading force via its weight along the loading direction on the spring support supporting the component. In order to ensure that the spring support can ensure resilient support of the component, the spring support usually comprises a housing in which a pressure spring is pretensioned, wherein the load of the component is deposited on the pretensioned pressure spring. Depending on the spring characteristic curve of the pressure spring, the pressure spring allows a specific path of displacement of the supported component in the loading direction if the loading force, which is exerted by the component on the spring support, varies by a specific amount. Therefore, conventional spring supports are capable of carrying components and to meet the expansion behaviour of the components, as a result of which impermissibly high tensions and destructions in a system with a respective component can be prevented effectively. Generic spring supports are usually formed in such a way that in their application they allow a path of displacement of up to 10 mm, partly up to 20 mm, and partly even up to 30 mm. For example, the path of displacement is obtained in pipeline construction from the spring characteristic curve and the requirement typically provided in pipeline construction that the loading force which is exerted by a pipeline on a spring support must not vary by more than 25% in all situations of the pipeline system. Generic spring supports are usually used for supporting components which exert a considerable loading force on the spring supports. Generic spring supports are typically used in a loading force range of approximately 0.2 to 400 kN, especially 0.5 to 100 kN.

Conventional spring supports are formed in such a way that they comprise a housing, a pressure plate, a load pipe and a pressure spring. The housing comprises a stand side and an upper side. An opening is provided in the upper side. The pressure plate is arranged in the housing and is displaceable within the housing in the loading direction, wherein the pressure spring is arranged between the pressure plate and the stand side and exerts a spring force on the pressure plate. Thereby the pressure spring is pretensioned in the loading direction in each position of the pressure plate within the housing so that it always presses the pressure plate in the loading direction towards the upper side against the housing. The load pipe is connected to the pressure plate and arranged in such a way that in each position of the pressure plate it extends from the interior of the housing through the opening to the outside. If a component is placed on the load pipe, it is thus supported in a resilient manner because the pressure spring exerts the spring force on the pressure plate and the load pipe is connected to the pressure plate.

A conventional spring support is prepared in the following way for the application for supporting a specific component which exerts a specific loading force: the load pipe is subjected at first to the specific, expected loading force of the component in the loading direction, as a result of which the pressure plate connected to the load pipe assumes a specific position in the housing along the loading direction towards the stand side. The position of the pressure plate in the housing is then fixed by a blocking apparatus. The component can then be placed on the spring support prepared in this manner, wherein the blocking apparatus can be removed after placing the component with the specific loading force, without the pressure plate and thus also the load pipe, substantially changing the respective position in relation to the housing of the spring support.

The height in the loading direction is thus predetermined by the loading force which acts on the spring support in the loading direction or for which the spring support is set. In the case of a number of known spring supports, a slight variation in the height of the spring support in the loading direction is possible irrespective of the respective loading force, in that the relative position of the load pipe to the pressure plate can be varied in a specific section in the loading direction, which is usually in a range of 10 to 30 mm. This allows a slight adjustment of the height to the desired installation environment.

Spring supports are conventionally formed in such a way that they can be used for a great range of loads. The minimal loading force, for which a spring support is capable for resilient support, is usually less than half the maximum loading force for which a spring support is similarly capable for resilient support. This wide range of application is realised in conventional spring supports in such a way that long coil springs are used as pressure springs in the loading direction, the pretension of which can be set by displacing the pressure plate in the housing to the desired loading force. This leads to a respective height of the housing in the loading direction, which is determined by the length of the pressure spring in the loading direction at the lowest possible pretension of the pressure spring.

This configuration of conventional spring supports has thus proven to be inappropriate for a number of fields of application. For example, it is frequently the case in pipeline construction that there is little space beneath the pipelines for housing the spring supports, so that the considerable extension of the spring support housing in the loading direction is frequently problematic. This is usually counteracted in such a way that spring supports of extremely high spring stiffness are used, which then ensures a low height of the housing in the loading direction on the one hand, which on the other hand provides only a very low path of displacement in the loading direction in the case of a variation of the loading force due to the high spring stiffness. This can lead to undesirable tensions in the supported components and thus in a pipeline system for example. A generic spring support is, e. g., disclosed in document U.S. Pat. No. 3,000,600 A. This spring support comprises a pressure plate as well as a spring arranged in the housing of the spring support, wherein the pressure plate is connected with a load pipe and wherein the spring exerts a force on the pressure plate. A distance element which is provided between the upper side of the housing and the spring plate determines the pretension of the spring. Further, there are known spring units with a telescopic housing. For example, document U.S. Pat. No. 4,457,196 A discloses a spring unit encapsulated in a housing having two parts, the spring unit being designed for use in a punching machine. Document EP 2 664 816 A2 discloses a spring designed for a resilient connection of two elements, wherein the spring comprises a housing consisting of two parts which are movable relative to each other.

SUMMARY

The invention is based on the object of providing a telescopable spring support which at least partly eliminates the disadvantages of conventional spring supports.

As a solution of this technical object, the invention proposes a telescopable spring support with the features according to claim 1. The spring support in accordance with the invention is telescopable and comprises a housing, a pressure plate, a load pipe, and a pressure spring. The housing has a stand side and an upper side. The upper side is offset relative to the stand side in the loading direction. The upper side is especially the side opposite the stand side. The housing is especially substantially hollow in the interior, so that sufficient free space is provided in the housing for the pressure plate, the pressure spring and at least one section of the load pipe. The housing can especially be formed in the manner of a hollow cylinder, wherein the stand side represents a first base area and the upper side represents a second base area of the cylindrical shape. The pressure plate is arranged in the housing and is displaceable within the housing in the loading direction. In this respect, during a displacement in the loading direction for example the pressure plate can be guided by the side walls of the housing extending between the upper side of the stand side of the housing. In particular, the pressure plate can rest on said side walls of the housing during its entire path of displacement within the housing in the loading direction or spaced therefrom only slightly so that a guidance of the pressure plate over its potential path of displacement in the loading direction is ensured. The side walls can extend at least in some sections in the loading direction for example.

The pressure spring is arranged between the pressure plate and the stand side and exerts a spring force on the pressure plate, which spring force is directed in the loading direction towards the upper side. The pressure spring is thus under a pretension in every possible position of the pressure plate in the loading direction and therefore exerts a spring force on the pressure plate in each of these positions. The magnitude of the spring force exerted by the pressure spring on the pressure plate is obviously dependent on the position of the pressure plate in the loading direction and thus on the pretension to which the pressure spring is subjected. In particular, the pressure spring can be formed as a coil spring whose spring direction extends in the loading direction.

The load pipe is connected to the pressure plate and extends in every possible position of the pressure plate along its path of displacement in the housing from the interior of the housing to the outside through an opening which is arranged on the upper side of the housing. It is focused in particular on the position of the pressure plate in the operational readiness state of the spring support. The opening provided on the upper side of the housing is adjusted to the dimensions of the pressure plate in such a way that the pressure plate cannot reach the outside through the opening, especially not as a result of the spring force of the pressure spring. The upper side thus limits the maximum distance which the pressure plate can have from the stand side in the loading direction. Since the load pipe extends through the opening to the outside in each position of the pressure plate, a load on the load pipe can always be exerted from the upper side onto the spring support, which is then resiliently supported via the pressure spring. The load pipe can for instance be connected to the pressure plate in a permanent manner with fixed position. For example, the load pipe can also be bolted to the pressure plate. In particular, such a connection between the pressure plate and the load pipe is possible in that different positionally fixed positions of the pressure plate and the load pipe with respect to each other can be set, wherein the position of the pressure plate and the load pipe with respect to each other can differ in the various positions in the loading direction.

The telescopable spring support in accordance with the invention is characterized in that the housing comprises a stand housing and a movable housing, wherein the movable housing is displaceable in the loading direction in relation to the stand housing, wherein the stand housing comprises the stand side and the movable housing comprises the opening. The stand housing and the movable housing are thus the housing elements of the housing of the spring support in accordance with the invention. The spring support is telescopable in the manner in accordance with the invention in the loading direction via the displaceability of the movable housing and the stand housing. In this process, the extension of the housing in the loading direction and thus the height of the housing of the loading direction are variable via the displaceability of the two housing elements. The housing of the spring support is thus telescopable. This is achieved especially by the fact that the stand housing comprises the stand side and the movable housing comprises the opening and thus at least one section of the upper side. The stand housing can be arranged for example in a direction perpendicularly to the loading direction within the movable housing, e.g. the movable housing can be arranged within a direction perpendicularly to the loading direction within the stand housing. The stand housing can be open in the loading direction at its end opposite the stand side, so that the pressure spring can extend from the stand side in the loading direction beyond the stand housing into the movable housing. In particular, the side opposite the stand side in the loading direction of the stand housing can be open, in that it comprises a passage of such dimensions that the pressure plate is displaceable in the housing in the loading direction in such a way that it can be arranged both in the stand housing and also in the movable housing, wherein a respective position of the pressure plate obviously also entails a respective pretension or loading of the pressure spring. In one embodiment, the relative position of the stand housing to the movable housing can be fixed by a blocking apparatus. In one embodiment, the stand housing and the movable housing are guided with respect to each other in such a way that the position of the pressure plate in the loading direction determines the relative position of the stand housing and the movable housing in the loading direction with respect to each other. For example, the stand housing and the movable housing can be arranged in a first relative position with respect to each other when the pressure plate is arranged within the stand housing in which the opening has the lowest possible distance from the stand side in the loading direction, wherein the distance of the opening from the stand side can increase with increasing distance of the pressure plate from the stand side when the pressure plate is arranged in the loading direction outside of the stand housing. In particular, the stand housing and the movable housing can be formed with respect each other in such a way that they are continuously and freely displaceable with respect to each other in the loading direction. The stand housing comprises a cylindrical guide, which is arranged on the side of the stand surface facing the interior space and extends with its cylindrical axis in the loading direction, wherein the cylindrical guide extends within the load pipe and is formed for guiding the load pipe.

For example, the cylindrical guide is formed in such a way that the load pipe slide along the guide in the direction of its cylindrical axis. The load pipe is retained and guided in a secure manner in each of its possible positions via the guide. For example, tilting of the load pipe under an oblique load of the load pipe by a component is prevented effectively via the guide. For example, the cylindrical guide is welded onto the stand side. In any case, the cylindrical guide is connected in a positionally fixed manner to the stand side of the stand housing. A guidance of the pressure plate is ensured via the cylindrical guide in addition to the guidance of the load pipe, or it is supported in a particular way because the pressure plate is always connected to the load pipe in accordance with the invention in the spring support which is ready for operation.

The telescopable spring support in accordance with the invention offers the advantage that its height of the housing is variable in the loading direction. As a result, the telescopable spring support in accordance with the invention is especially advantageous for such fields of application and is superior to conventional spring supports in which there is only little space beneath the components for supporting the component. The spring support in accordance with the invention further offers the advantage that spring supports with low spring constants can also be used in said supports for the resilient support of components which exert a great loading force in the loading direction on the spring support without producing any excessively great height of the housing in the loading direction.

The spring support in accordance with the invention can especially be formed in such a way that its height of the housing decreases with increasing load or pretension in that in this case the length of the pressure spring is decreased in the loading direction, which entails a respective position of the pressure plate in the housing and thus a respective displacement of the movable housing in relation to the stand housing in such a way that the opening only has a low distance in the loading direction from the stand side and the height of the housing is thus low. The spring support in accordance with the invention thus ensures the provision of a spring support with a low height of the housing in the loading direction which can resiliently support heavy components and can still ensure an adequate path of displacement due to the low spring constants. Furthermore, the spring support in accordance with the invention allows the use of pressure springs with a specific spring constant in a wide loading force range, which has a positive effect on the production of the spring support due to the frequent usability of one and the same type of pressure spring. For example, a spring support in accordance with the invention can be formed in such a way that it is capable of the resilient support of loading force is which lie between 30% and 100% of the maximum loading force or the maximal spring force.

In one embodiment, the stand housing and the movable housing each comprise a hollow cylindrical section, wherein especially the two hollow cylindrical sections are arranged in such a way that their cylinder axes coincide and extend in the loading direction. For example, the hollow cylindrical sections of the two housing elements can be formed by a tubular section. For example, the hollow cylindrical sections of the two housing elements can be arranged with respect to each other in such a way that the one hollow cylindrical section is arranged in a direction perpendicularly to the loading direction in the other hollow cylindrical section, so that a guidance of the two housing elements is ensured during a displacement of the movable housing in relation to the stand housing via the hollow cylindrical sections. The provision of the hollow cylindrical sections in the two housing elements can thus be advantageous for ensuring the guidance between the housing elements, especially a uniformly good guidance of the two housing elements can be ensured with respect to each other over the entire possible path of displacement of the movable housing in relation to the stand housing. Furthermore, the production of the two housing elements with hollow cylindrical sections can be simplified in particular, especially when realising the hollow cylindrical sections via a tubular section.

The stand housing preferably comprises a first locking projection and the movable housing comprises a second locking projection, wherein the two locking projections are formed for limiting the displaceability of the movable housing in relation to the stand housing in the loading direction, wherein the two locking projections are arranged in the housing in such a way that they rest on each other at a distance of the movable housing from the stand side which is at a maximum in the loading direction. For example, the first loading projection can be arranged at an end of the stand housing which faces the upper side. For example, the first locking projection can limit a passage at the end of the stand housing which is opposite the stand side in the loading direction. For example, the second locking projection can be arranged at an end of the movable housing which faces the stand side. At least one of the two locking projections can be arranged on a side wall of the respective housing element which extends in the loading direction and can extend from the side wall in a direction perpendicularly to the loading direction. The displaceability of the movable housing in relation to the stand housing can be limited effectively via the two locking projections, in that a maximum distance of the movable housing from the stand side is predetermined in the loading direction. As a result, this can prevent instabilities of the spring support in the case of an excessive extension of the spring support in the loading direction. In particular, the two locking projections can provide security that the movable housing is tightly retained in relation to the stand housing, which still is valid in the case if a load on the load pipe decreases suddenly, e.g. in that a component abruptly slides off the spring support. In this case, the pressure plate, driven by the pressure spring, shoots away from the stand side in the loading direction. It can be effectively prevented by the locking projections that in such a case the two housing elements can be ripped apart and can be ejected to the ambient environment, e.g. together with the pressure plate and the pressure spring. This is especially relevant and advantageous due to the high spring forces of the pressure spring, which in accordance with the application are necessary due to the high loading force to be supported.

In one embodiment, the movable housing comprises a retaining projection at its end facing the upper side, which retaining projection extends perpendicularly to the loading direction and which delimits the opening. When forming the movable housing in the manner of a hollow cylinder, this concerns the axial end of the movable housing and the retaining projection extends in the radial direction. By delimiting the opening by a respective retaining projection, the opening can be limited to such dimensions that the pressure plate is reliably unable to reach the outside through the opening, which is even not possible when it is pressed with a high spring force of the pressure spring in the loading direction towards the upper side and thus against the edge of the opening and thus against the retaining projection.

The stand housing and/or the movable housing preferably comprises a hollow cylindrical section which is formed from a tube, wherein at least one of the locking projections or the retaining projection is formed by forming the tube. A respective projection can be formed in an especially simple and stable manner by forming the tube. The forming can be formed as an inwardly or outwardly formed portion. At least one of the projections can also be realised in such a way that it is welded onto a respective hollow cylindrical section. As a result, the shape of the projection can be adjusted in an especially simple way and the production of the projection can also be provided in a simple way by ensuring high stability.

The movable housing is preferably arranged in a direction perpendicularly to the loading direction within the stand housing. As a result, a relatively great extension of the stand housing perpendicularly to the loading direction and thus a stable stand of the spring support on the stand side can be ensured. Furthermore, the displaceability of the two housing elements can be realised in an especially simple way and a guidance of the pressure spring and the pressure plate within the movable housing can be provided in an especially advantageous way. The pressure spring is preferably arranged in one direction perpendicularly to the loading direction within the movable housing and within the stand housing. As a result, the pressure spring can be retained in an especially secure way within the housing on the one hand, and on the other hand an especially good guidance of the pressure plate and/or the pressure spring can be ensured for ensuring a guided displaceability of the pressure plate within the housing.

In one embodiment, the stand side of the stand housing comprises a fixing projection at its side facing towards the interior space of the housing and/or the pressure plate comprises a fixing projection at its side facing the stand side, which fixing projection is arranged in a direction perpendicularly to the loading direction within or outside of the pressure spring for the purpose of preventing a displacement of the pressure spring, especially perpendicularly to the loading direction, in the housing. The fixing projection is preferably arranged in a positionally fixed manner to the stand side or the pressure plate. For example, the fixing projection can be provided integrally in an integral pressure plate. The fixing projection can be welded onto the stand side for example. The fixing projection can be formed in an annular way for example. The pressure spring can rest on the fixing projection for example, especially rest thereon circumferentially. The stability of the spring support can be increased in an especially advantageous manner via a respective fixing projection in that the pressure spring can be securely guided within the housing. Especially good guidance between the pressure plate and the pressure spring can be ensured in particular by the fixing projection on the pressure plate. As a result, a guidance of the pressure plate, e.g. via side walls of the housing extending in the loading direction, can entail a guidance of the pressure spring, and conversely a guidance of the pressure spring can produce a guidance of the pressure plate.

In one embodiment, the pressure plate comprises a recess through which the load pipe extends. The load pipe accordingly extends in the loading direction on both sides of the pressure plate, which can thus ensure especially good guidance of the load pipe and the pressure plate. The recess preferably comprises an internal thread, which corresponds to an external thread arranged on the exterior side of the load pipe, wherein the load pipe is connected to the pressure plate via the corresponding exterior and internal threads, and a specific distance of the load pipe to the stand side is adjustable in the loading direction at a specific position of the pressure plate. In this embodiment, the height of the spring support in the loading direction can further be changed in addition to the variability of the height of the housing in the loading direction in such a way that the distance of the load pipe to the stand side is set. This allows an even greater field of application of the spring support in accordance with the invention. In this respect, the pressure plate, load pipe and housing can be formed in a corresponding manner with respect to each other in such a way that the threads on the pressure plate and the load pipe allow a reduction in the distance between the load pipe and stand side only to the extent that the load pipe, when the pressure plate rests on the upper side of the movable housing, does not rest on the stand side even in the case of the minimally adjustable height of the housing in the loading direction so that in this position too an adequate spring travel is ensured when the spring support is loaded in the loading direction. The internal and external threads on the pressure plate and the load pipe can be formed in such a way for example that they allow a relative displacement of pressure plate and load pipe with respect each other in a sectional range of up to 30 mm, especially up to 20 mm.

In one embodiment, the movable housing comprises at least one bead, which is arranged in a depression of the pressure plate when the pressure plate rests on the upper side of the housing facing the interior space so as to prevent a twisting of the pressure plate in relation to the movable housing about the loading direction. For example, the pressure plate can rest for this purpose on a section of the upper side facing the interior space. For example, the pressure plate can rest for this purpose on a retaining projection which delimits the opening. An especially stable position of the spring support can be provided by arranging the bead of the movable housing in the depression of the pressure plate. In particular, this can reliably allow a relative twisting of the load pipe in relation to the pressure plate, e.g. for setting the distance of the load pipe from the stand side of the stand housing.

A load plate is preferably arranged at the axial end of the load pipe which faces away from the stand side, on which a sliding element can be arranged in particular. The load pipe can reliably take up a considerable load of a component via the load plate. The sliding element can allow a displacement of the component on the pressure plate without leading to any friction between the component and the load plate and any tilting or destruction of the spring support.

The load pipe can comprise at least one borehole at its axial end facing away from the stand side, which borehole extends perpendicularly to the loading direction through the load pipe. The load pipe can thus be twistable for example in an especially simple way relative to the pressure plate and/or the housing.

In one embodiment, the stand housing comprises at least two recesses in its side wall extending in the loading direction, which recesses each extend over at least half the extension of the stand housing in the loading direction and are capable of accommodating a blocking apparatus, which comprises a retaining device for retaining a projection arranged on the movable housing for fixing a relative position of the stand housing and the movable housing with respect to each other. Respective blocking apparatuses are generally known to the person skilled in the art and are usually used for setting a pretension of the pressure spring so that the spring support can be set to the expected loading force of a component. A fixing of the relative position of the pressure plate in relation to the housing usually occurs in conventional spring supports, wherein the pressure plate comprises respective projections on which a retaining device can act. The described embodiment pursues a different approach. In the described embodiment, a projection is arranged on the movable housing, wherein the pretension of the pressure spring is set via a position of the movable housing relative to the stand housing. The aforementioned second locking projection can be used for example as such a projection. Such a projection can be arranged on the exterior side of the movable housing for example, e.g. it can be welded thereon, wherein the movable housing can be arranged in a direction perpendicularly to the loading direction within the stand housing. An especially simple fixing of the relative position of the stand housing and movable housing and thus an especially simple fixing of a pretension of the pressure spring can be provided via a respective recess in the stand housing. For example, the two recesses can be provided on mutually opposite sides of the stand housing, so that uniform fixing of the movable housing in relation to the stand housing can be provided. For example, more than two recesses can be provided so that several blocking apparatuses can be inserted into the recesses, so that their retaining devices can act on the projection of the movable housing. In particular, the blocking apparatus can extend through a side wall of the stand housing up to the movable housing. In particular, the recesses can extend over at least 70% of the extension of the stand housing in the loading direction, as a result of which the pretension of the pressure spring can be fixed within a wide range.

BRIEF DESCRIPTION OF THE DRAWINGS

The invention will be explained below in closer detail by reference to an embodiment shown in the schematic drawings, wherein:

FIG. 1b shows a schematic semi-sectional view of the embodiment according to FIG. 1a;

FIG. 2 shows a further schematic sectional view of the embodiment according to FIG. 1a;

FIG. 3b shows a schematic semi-sectional view of the embodiment with the blocking apparatus according to FIG. 3a.

DETAILED DESCRIPTION

Figure 1A:
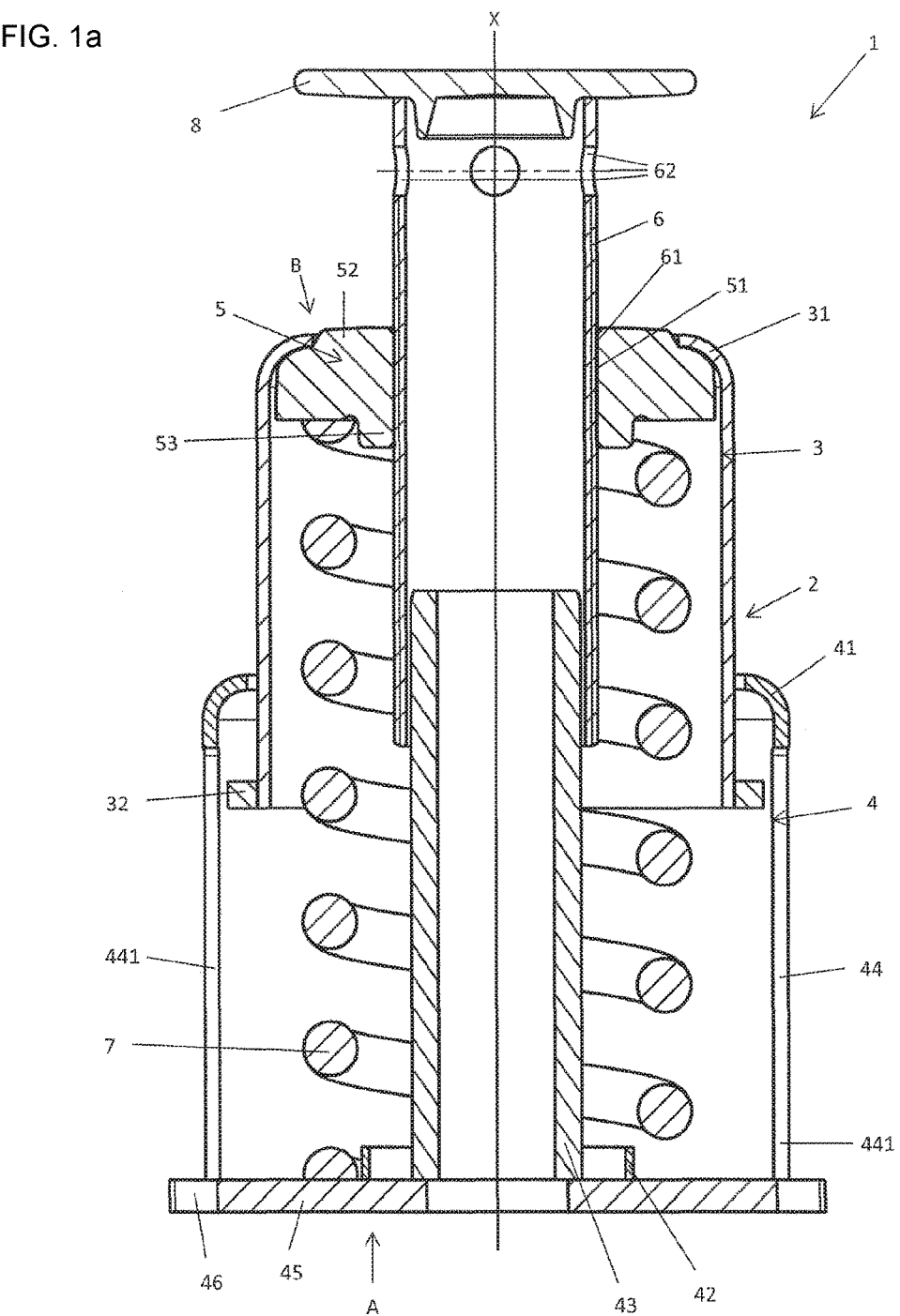
FIG. 1a shows a schematic sectional view of an embodiment of the spring support in accordance with the invention.

FIG. 1a shows a schematic sectional view through an embodiment of the spring support 1 in accordance with the invention. The spring support 1 comprises a housing 2, which consists of a stand housing 4 and a movable housing 3. The two-part configuration of the housing 2 which results therefrom can be generally advantageous and especially simple. The stand housing is formed in the manner of a hollow cylinder. The stand side A of the spring support 1, on which the spring support 1 is placed in its operating position, is arranged on the stand housing 4. The stand housing 4 comprises a base plate 45 in which holes 46 are provided, so that the base plate 45 can be rigidly bolted to the ground. A first fixing projection 42, a cylindrical guide 43 and a tubular section 44 are welded onto the base plate. The tubular section 44 is formed in the manner of a hollow cylinder and has an outer diameter of approximately 200 mm. At its end facing the upper side, the stand housing 4 comprises a first locking projection 41 which is formed by an inwardly formed portion of the tubular section 44. The stand housing 4 is open towards the upper side and therefore comprises a passage whose diameter is limited by the first locking projection 41.

The movable housing 3 is arranged within the stand housing 4 in a direction perpendicularly to the loading direction X. In this case, the movable housing 3 extends in the loading direction X through the passage in the stand housing 4, so that it is arranged in the loading direction X on both sides of the passage. The movable housing 3 is formed as a further hollow cylindrical section, on which a second locking projection 32 and a retaining projection 31 are arranged. The hollow cylindrical section is made of a tube, wherein the retaining projection 31 is formed by an inwardly formed portion of the tube. The second locking projection 32 is formed in the manner of a ring and welded onto the tubular section, wherein the second locking projection 32 extends to the outside perpendicularly to the loading direction X from the side wall of the movable housing 3. The tubular section forming the hollow cylindrical section of the movable housing 3 has an outer diameter of approximately 185 mm. The diameter of the passage in the stand housing 4 is approximately 190 mm, so that a substantially friction-free displaceability of the movable housing 3 in relation to the stand housing 4 is made possible. The second locking projection 32 has an outer diameter of approximately 195 mm. Accordingly, the movable housing 3 and the stand housing 4 are formed with their locking projections 41, 32 in such a way that the displaceability of the movable housing 3 in relation to the stand housing 4 is limited, wherein a maximum distance of the movable housing 3 from the stand side A of the stand housing 4 is predetermined, wherein the two locking projections 32, 41 rest on each other when reaching the maximum distance of the movable housing 3 from the stand side A. The sliding apart of the movable housing 3 and the stand housing 4 is thus effectively prevented, so that it is excluded in the illustrated embodiment that in the case of a sudden decrease in the loading force acting on the load pipe 8 the movable housing 3 and/or the pressure spring 7 and/or the pressure plate 5 jump apart and cause damage.

The pressure spring 7 is arranged in a direction perpendicularly to the loading direction X, both within the movable housing 3 and also within the stand housing 4. The pressure spring 7 always extends from the side of the base plate 45 facing the interior space of the housing 2 up to the side of the pressure plate 5 facing the stand side A. The pressure spring 7 is guided via a first fixing projection 42 on the base plate 45 of the stand housing 4 and via a second fixing projection 53 on the pressure plate 5. This effectively prevents a displacement of the pressure spring 7 in a direction perpendicularly to the loading direction X and high stability of the spring support 1 is ensured. The first fixing projection 42 is formed in an annular manner, whereas the second fixing projection 43 is provided integrally as a projection in the pressure plate 5. The two fixing projections 42, 53 each extend radially within the pressure spring 7 and rest on the radial inner side of the pressure spring 7.

As a result of the pressure spring 7, the pressure plate 5 is pressurised with a spring force in each of its possible positions along the loading direction X within the housing 2, which spring force is directed towards the upper side B of the housing 2 in the loading direction X. The pressure plate 5 comprises a recess in which a load pipe 6 is arranged. An internal thread 51 is provided in the recess of the pressure plate 5, which internal thread corresponds to an external thread 61 provided on the load pipe 6. The relative position of the pressure plate 5 and the load pipe 6 in the loading direction X is thus variable with respect to each other. In the illustrated embodiment, the internal thread 51 and the external thread 61 allow a displaceability of the load pipe 6 in relation to the pressure plate 5 in the loading direction X by approximately 20 mm. Accordingly, at a specific position of the pressure plate 5 in the housing 2 and at a specific position of the movable housing 3 and the stand housing 4 with respect to each other, the height of the spring support 1 in the loading direction X can be varied by twisting the load pipe 6 in relation to the pressure plate 5 by the aforementioned amount of approximately 20 mm. The height of the spring support 1 can thus be adjusted especially well to the operational environment. Two boreholes 62 are provided for this purpose in the load pipe 6, which boreholes extend in a direction perpendicularly to the loading direction X through the load pipe 6 and via which the load pipe 6 can be twisted easily relative to the pressure plate 5.

The load pipe 6 is guided by the cylindrical guide 43. It is thus ensured via the cylindrical guide 43 that the load pipe 6 is displaceably guided in the displacement direction X, so that tilting of the load pipe 6 relative to the base plate 45 of the stand housing 4 can effectively be prevented, which further increases the stability of the spring support 1. In the position shown in FIG. 1*a*, in which the pressure plate 5 rests on the upper side B of the housing 2, a centring projection 52 of the pressure plate 5 rests in a flush manner on the retaining projection 31 of the movable housing 3. This ensures especially good guidance of the pressure plate 5 relative to the housing 2, which can be especially advantageous when placing a component on the spring support 1. A load plate 8 is further provided for contact between the spring support 1 and a component, which load plate is arranged at the end of the spring support 1 on the load pipe 6, which end of the spring support 1 faces away from the stand side in the loading direction X. A uniform transmission of the force exerted by the component to the load plate 8 occurs via the load plate 8 onto the load pipe 6.

Figure 1B:
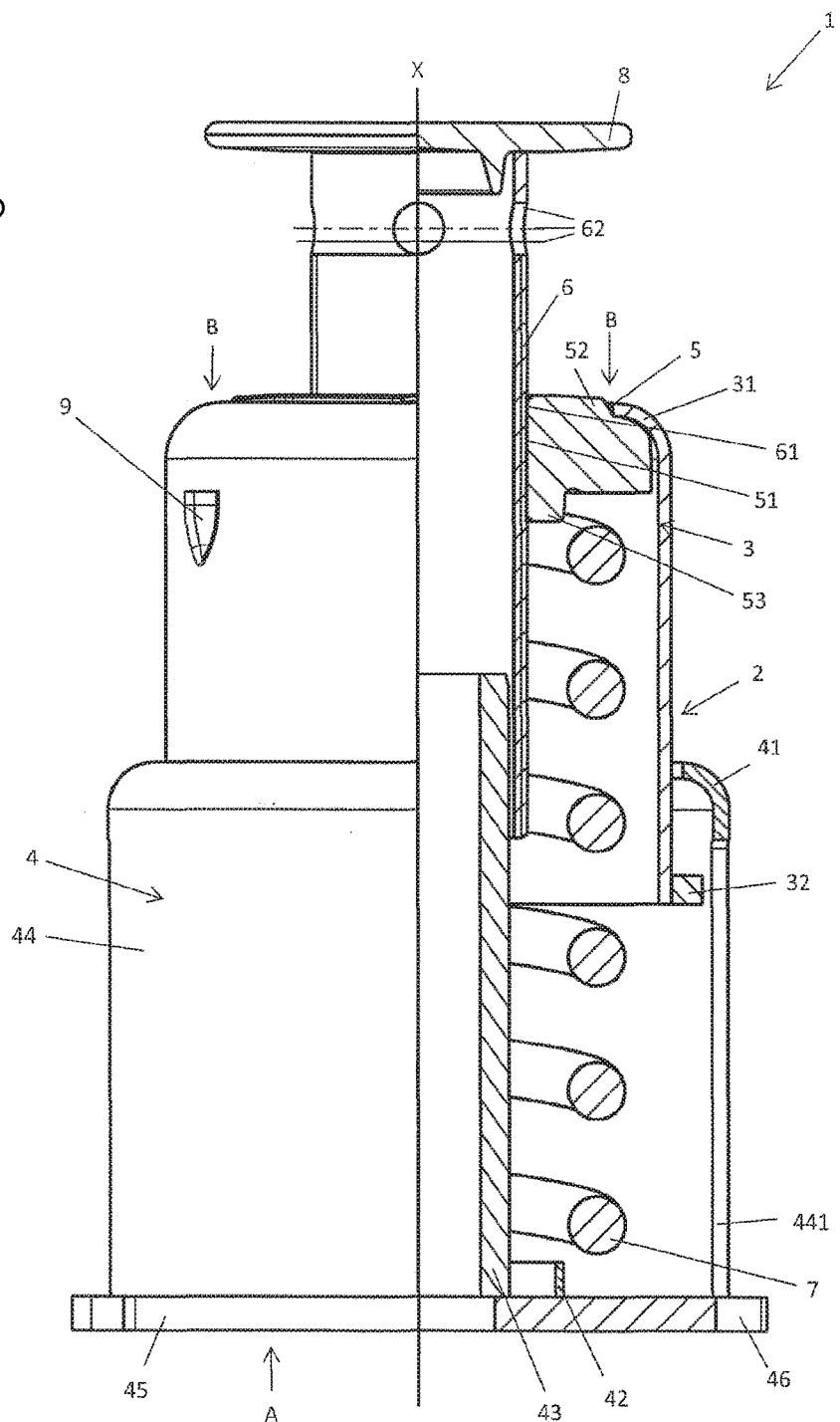
Figure 2:
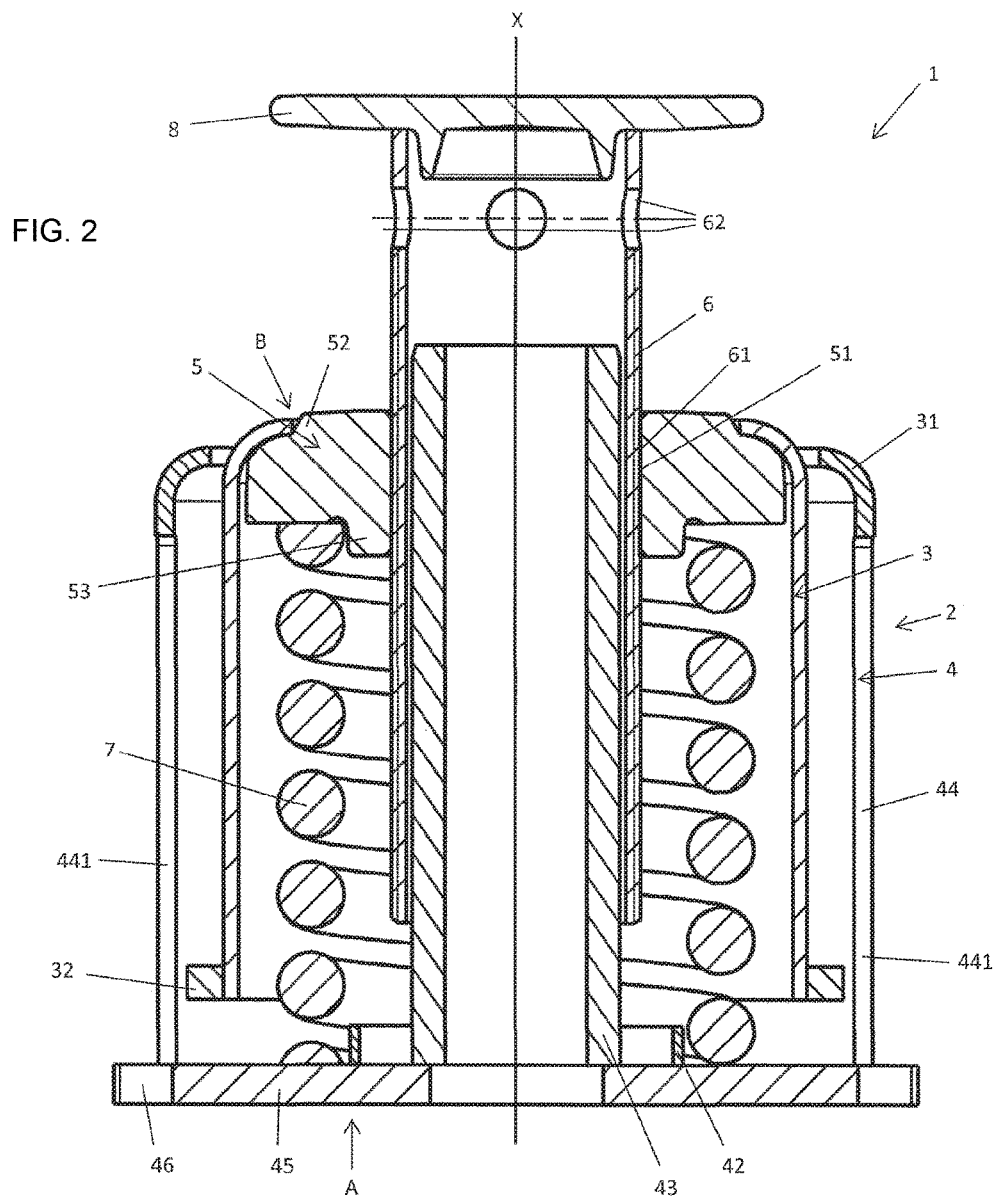

The embodiment shown in FIGS. 1 to 3 of the spring support 1 in accordance with the invention is capable of supporting components which exert a loading force of approximately 3 to 10 kN on the load plate 8. The height of the housing in the loading direction X assumes a specific amount depending on the loading of the pressure plate 8 with a specific loading force. In the embodiment shown in FIG. 1*a*, the load plate 8 is loaded with a low loading force of approximately 5 kN. Accordingly, the movable housing 3 is spaced relatively far from the stand side A of the housing 2, thus leading to a relatively high height of the housing in the loading direction X.

For the purpose of illustrating the embodiment of the spring support 1 in accordance with the invention which is shown in FIG. 1*a* in a full sectional view, the spring support 1 is shown in the same position in FIG. 1*b* in a semi-sectional view. FIG. 1*b* clearly shows the two tubular sections of the stand housing 4 and the movable housing 3 which circumferentially enclose the pressure plate 5, the load pipe 6 and the sliding guide 43. It is further shown in FIGS. 1*a* and 1*b* that the stand housing 4 comprises two recesses 441 which extend in the loading direction X over a considerable portion of the extension of the stand housing 4 in the loading direction X, which in the present case is more than approximately 80% of said extension. Said recesses 441 are disposed opposite each other and are formed for the purpose that a blocking apparatus 10 can be introduced into the recesses 441 and can be fixed on the second locking projection 32 of the movable housing 3 for the purpose of fixing the relative position of the movable housing 3 and the stand housing 4 with respect to each other. The arrangement and effect of the blocking apparatus 10 is explained in closer detail in FIGS. 3*a* and 3*b*. The bead 9 which is comprised by the movable housing 3 can further be recognised from FIG. 1*b*. As is not shown in FIG. 1*b*, the bead 9 is arranged in a depression on the pressure plate 5 for fixing the pressure plate in the position shown in FIGS. 1*a*, 1*b* and for preventing a relative twisting of the pressure plate 5 in relation to the movable housing 3.

FIG. 2 shows the spring support 1 according to FIGS. 1*a* and 1*b* in a full sectional view in a state in which it is subjected to a high loading force in the loading direction X on the pressure plate 8, which loading force is approximately 9 kN in the illustration of FIG. 2. FIG. 2 shows that the height of the housing in the loading direction X is considerably reduced in comparison with the illustration according to FIGS. 1*a* and 1*b*. Accordingly, a pressure spring 7 with a relatively low spring constant can be used in the illustrated embodiment of the spring support 1 in accordance with the invention, which pressure spring ensures a high load capacity for carrying a high loading force in the loading direction X in a low installation height, namely the height of the spring support 1 in the loading direction X. The relative displacement of the pressure plate 5 relative to the stand housing 4 is principally also possible if the movable housing 3 rests on the base plate 45 of the stand housing 4 since the pressure plate 5 is still displaceable relative to the movable housing 3 in the loading direction X. The maximum possible loading of the spring support 1 with a loading force in the loading direction X is predetermined either by the pressure spring 7 or by the limit stop of the load pipe 6 on the base plate 45.

Figure 3A:
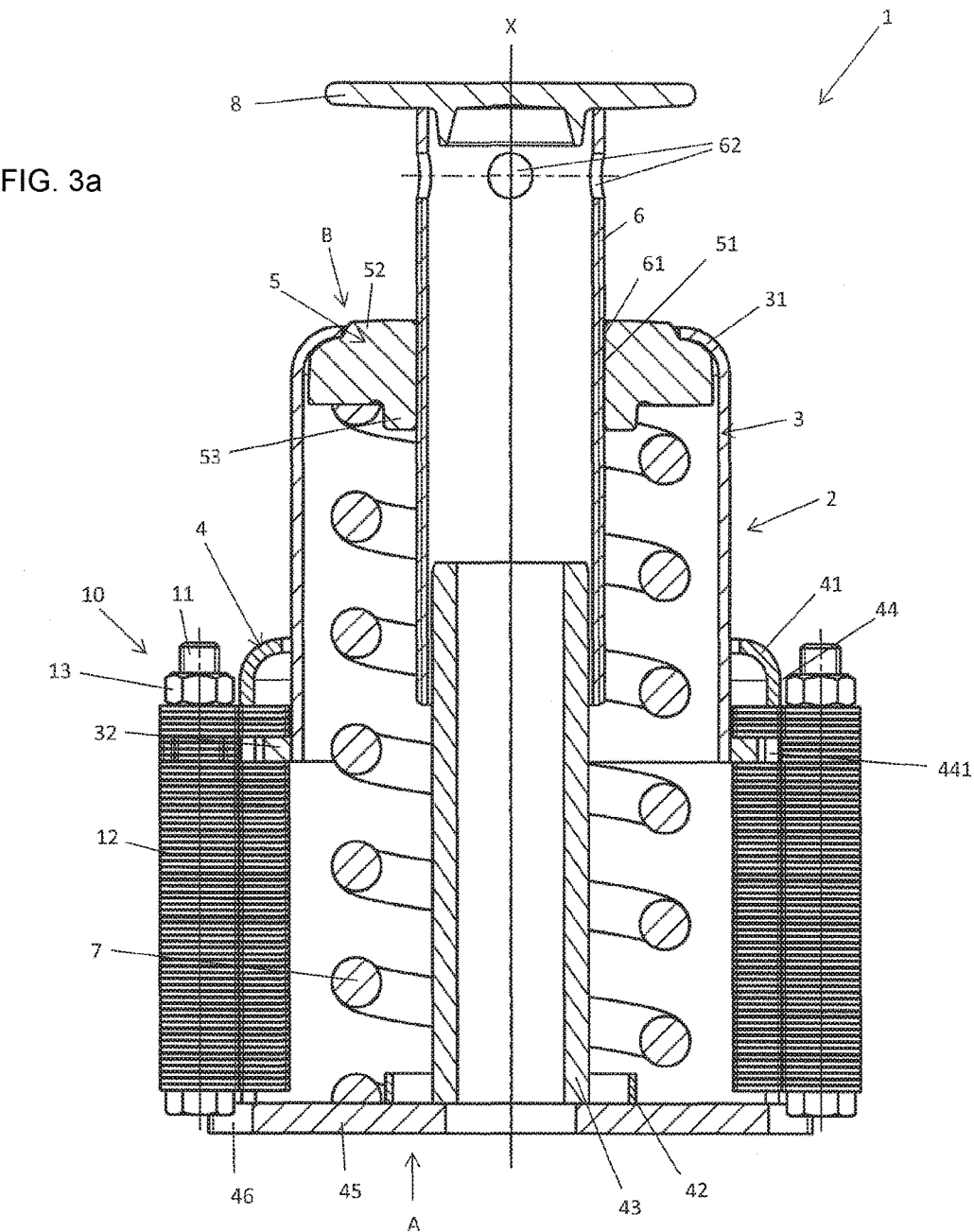
FIG. 3a shows a schematic sectional view of the embodiment according to FIG. 1a with a blocking apparatus.
Figure 3B:
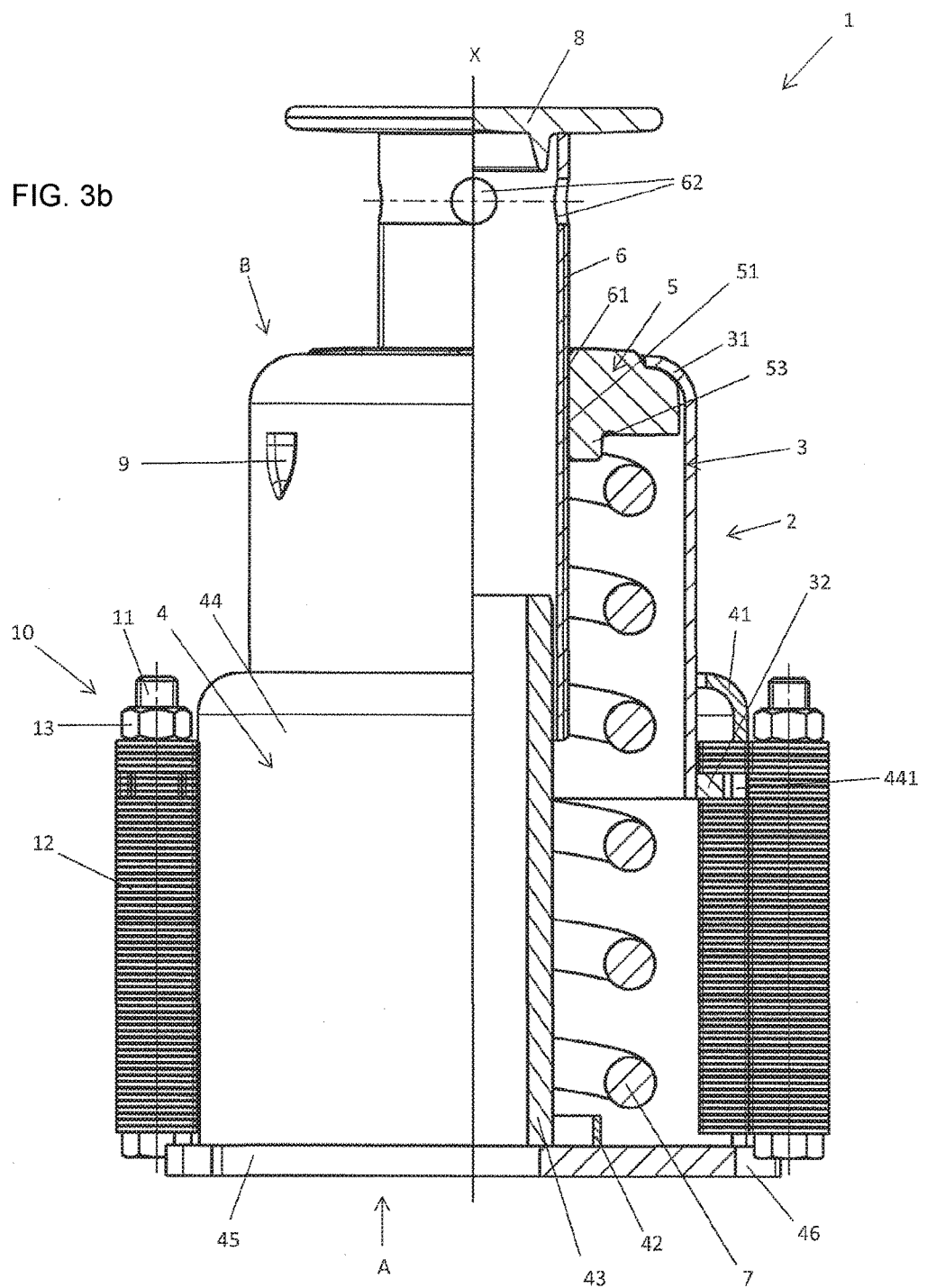

In FIGS. 3*a* and 3*b*, the spring support 1 in accordance with the invention is shown in the position as illustrated in FIGS. 1*a* and 1*b*, wherein the relative position of the movable housing 3 and the stand housing 4 with respect to each other is secured by a blocking apparatus 10. The blocking apparatus 10 comprises a bolt 11 and blades 12, wherein the blades 12 are fixed with respect each other by bolting the nuts 13 together with the bolts 11. FIGS. 3*a* and 3*b* show that the blades 12 represent a retaining device, which blades extend from the exterior side of the stand housing 4 through the recess 441 in the side wall of the stand housing 4 extending in the loading direction X up to the exterior wall of the movable housing 3, which extends in the loading direction X. The blades 12 arranged at the height of the second locking projection 32 are deflected in comparison with the remaining blades 12 of the blocking apparatus 10, so that a clearance is obtained between said remaining blades 12 in which the second blocking projection 32 is arranged. The relative position of the movable housing 3 relative to the stand housing 4 is secured by the arrangement of the blocking apparatus 10 in the recess 441 and the clamping of the retaining device with the second locking projection 32 which is ensured by the blades 12. For example, the spring support 1 can be placed with the blocking apparatus 10 according to FIGS. 3*a* and 3*b* beneath a component, wherein a pretension of the pressure spring 7 in the housing 2 is set by the blocking apparatus 10, which is adjusted to the expected loading force of the component. As soon as the component acts with its loading force on the load plate 8, the blocking apparatus 10 can be released by releasing the nuts 13 from the second locking projection 32 and be removed from the spring support 1 without producing any substantial change in the height of the spring support 1 in the loading direction X.

The advantageousness of the spring support 1 in accordance with the invention is clearly illustrated to the person skilled in the art from the illustrated embodiment. Since the housing 2 of the spring support 1 is telescopable in the loading direction X, the spring support 1 can be used in a wide load range, wherein a low height of the housing of the spring support 1 is ensured when loading the spring support 1 with a high loading force. The invention can generally relate to spring supports in which the stand housing 4 has an outer diameter perpendicularly to the loading direction X of approximately 100 to 350 mm, especially 120 to 320 mm, and the movable housing 3 has a respective outer diameter of approximately 100 to 300 mm, especially 125 to 290 mm. It can especially be generally advantageous that the movable housing 3 is arranged in a direction perpendicularly to the loading direction X within the stand housing 4, wherein the outer diameter of the movable housing 3 in this direction is approximately 90 to 95% of the respective outer diameter of the stand housing 4. This can ensure a substantially friction-free displacement of the two housing elements with respect to each other on the one hand and an adequate clearance within the movable housing 3 for the pressure spring 7 and the pressure plate 5 as well as the load pipe 6 and the cylindrical guide 43 on the other hand.

LIST OF REFERENCE NUMERALS

1 Spring support
2 Housing
3 Movable housing
4 Stand housing
5 Pressure plate
6 Load pipe
7 Pressure spring
8 Load plate
9 Bead
10 Blocking apparatus
11 Bolt
12 Blade
13 Nut
31 Retaining projection
32 Second locking projection
41 First locking projection
42 First fixing projection
43 Cylindrical guide
44 Tubular section
45 Base plate
46 Hole
51 Internal thread
52 Centring projection
52 Second fixing projection
61 External thread
62 Borehole
441 Recess
A Stand side
B Upper side
X Loading direction

What is claimed is:

1. A telescopable spring support for resilient support in a loading direction, comprising:
    a housing, the housing having an interior comprising an interior space,
    a pressure plate,
    a load pipe, and
    a pressure spring,
    wherein the housing comprises a stand side and an upper side,
    wherein the pressure plate is arranged in the housing and is displaceable within the housing in the loading direction,
    wherein the pressure spring is arranged between the pressure plate and the stand side and exerts a spring pressure on the pressure plate which is directed in the loading direction towards the upper side,
    wherein the load pipe is connected to the pressure plate and extends outside the housing from the interior of the housing through an opening which is arranged on the upper side of the housing,
    wherein the housing comprises a stand housing and a movable housing,
    wherein the movable housing is displaceable in the loading direction relative to the stand housing,
    wherein the stand housing comprises the stand side and the movable housing comprises the opening,
    wherein the stand housing comprises a cylindrical guide having a cylindrical axis, the cylindrical guide arranged on the stand housing such that the cylindrical guide faces the interior space and extends within the interior space with the cylindrical axis in the loading direction, wherein the cylindrical guide extends within the load pipe and is formed for guiding the load pipe.

2. The telescopable spring support according to claim 1, wherein the stand housing and the movable housing each comprise a hollow cylindrical section having a cylindrical axis, wherein the hollow cylindrical sections of the stand housing and the movable housing are arranged such that the cylinder axes coincide and extend in the loading direction.

3. The telescopable spring support according to claim 1, wherein the stand housing comprises a first locking projection and the movable housing comprises a second locking projection, wherein the first and the second locking projections are formed for limiting the displaceability of the movable housing relative to the stand housing in the loading direction, wherein the first and the second locking projections are arranged in the housing such that the first and the second locking projections rest on each other at a distance of the movable housing from the stand side which is at a maximum in the loading direction.

4. The telescopable spring support according to claim 3, wherein the stand housing, or the movable housing, or both the stand housing and the movable housing, comprises a hollow cylindrical section which is shaped from a tube, wherein at least one of the first and the second locking projections is shaped by forming the tube.

5. The telescopable spring support according to claim 1, wherein the movable housing comprises a retaining projection which extends perpendicularly to the loading direction and which delimits the opening.

6. The telescopable spring support according to claim 1, wherein the movable housing is arranged within the stand housing with regard to a direction perpendicular to the loading direction.

7. The telescopable spring support according to claim 1, wherein the pressure spring is arranged within the movable housing and within the stand housing with regard to a direction perpendicular to the loading direction.

8. The telescopable spring support according to claim 1, wherein the stand housing, or the pressure plate, or both the stand housing and the pressure plate, comprise a fixing projection which is arranged within the pressure spring with regard to a direction perpendicular to the loading direction for preventing a displacement of the pressure spring in the housing.

9. The telescopable spring support according to claim 1, wherein the pressure plate comprises a recess through which the load pipe extends.

10. The telescopable spring support according to claim 9, wherein the recess comprises an internal thread, which corresponds to an external thread arranged on the load pipe, wherein the load pipe is connected to the pressure plate via the corresponding exterior and internal threads, and a specific distance of the load pipe from the stand side is adjustable in the loading direction at a specific position of the pressure plate.

11. The telescopable spring support according to claim 1, wherein the movable housing comprises at least one bead, which is arranged in a depression of the pressure plate when the pressure plate rests on the upper side of the housing facing the interior space so as to prevent a twisting of the pressure plate relative to the movable housing about that the loading direction.

12. The telescopable spring support according to claim 1, wherein a load plate is arranged at an axial end of the load pipe which faces away from the stand side, on which a sliding element is arranged.

13. The telescopable spring support according to claim 1, wherein the load pipe comprises at least one borehole at an axial end facing away from the stand side, which borehole extends perpendicularly to the loading direction through the load pipe.

14. The telescopable spring support according to claim 1, wherein the stand housing comprises at least two recesses in a side wall extending in the loading direction, which recesses each extend over at least half an extension of the stand housing in the loading direction and are configured to accommodate a blocking apparatus, which comprises a retaining device for retaining a projection arranged on the movable housing for fixing a relative position of the stand housing and the movable housing with respect to each other.

15. The telescopable spring support according to claim 1, wherein the cylindrical guide is arranged on the stand side of the stand housing.

16. The telescopable spring support according to claim 15, wherein the cylindrical guide is arranged on a side of the stand side that faces the interior space.

17. The telescopable spring support according to claim 15, wherein the cylindrical guide is connected to the stand side of the housing.

18. The telescopable spring support according to claim 17, wherein the cylindrical guide is positionally fixed to the stand side of the housing.

19. The telescopable spring support according to claim 18, wherein the stand side of the housing comprises a base plate, and the cylindrical guide is welded to the base plate.

* * * * *